March 16, 1943.  A. D. GRAU  2,314,206
JUICE EXTRACTING DEVICE
Filed Oct. 21, 1940  2 Sheets-Sheet 1

Albert D. Grau, INVENTOR

BY Victor J. Evans & Co.
ATTORNEYS

WITNESS

March 16, 1943. A. D. GRAU 2,314,206
JUICE EXTRACTING DEVICE
Filed Oct. 21, 1940 2 Sheets-Sheet 2
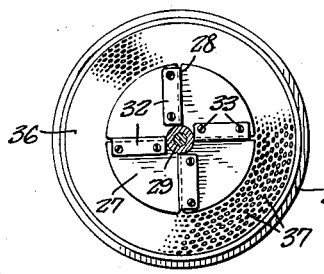
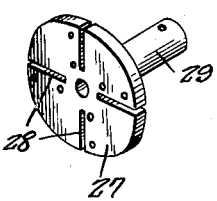
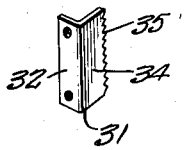
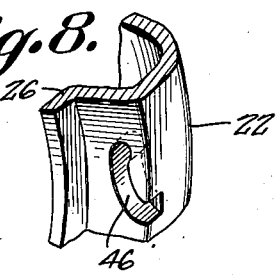
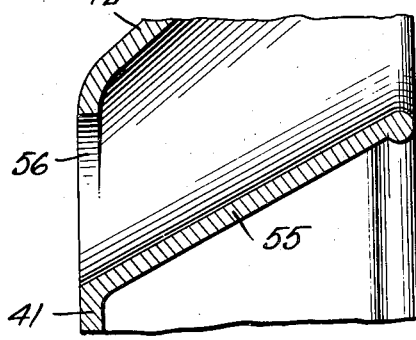
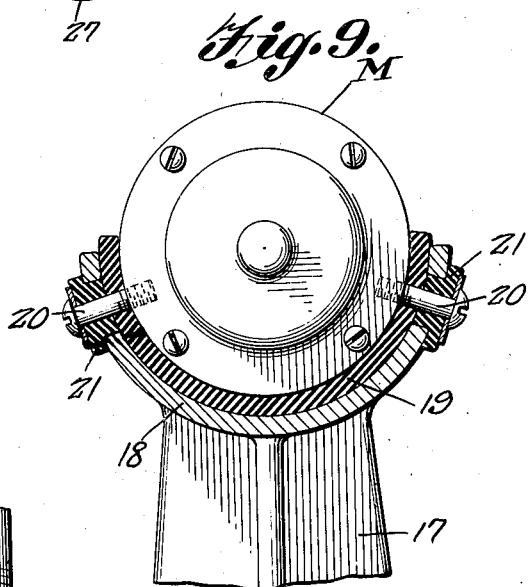
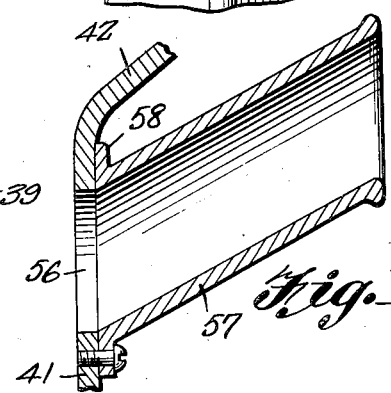
Albert D. Grau, INVENTOR
BY Victor J. Evans & Co.
ATTORNEYS Patented Mar. 16, 1943

2,314,206

UNITED STATES PATENT OFFICE 2,314,206

JUICE EXTRACTING DEVICE

Albert D. Grau, Tacoma, Wash.

Application October 21, 1940, Serial No. 362,164

3 Claims. (Cl. 146—3)

The present invention relates to improvements in juice extracting devices and has for its primary object to provide a juice extracting device of novel compact design.

Another object of the invention is the provision of a juice extracting device which is strong and durable yet relatively inexpensive in construction.

A further object of the invention is the provision of a juice extracting device which is rapid, efficient and reliable in operation.

Still another object of the invention is the provision of a juice extracting device of the aforesaid character which is equipped with means to prevent clogging thereof.

Other objects and advantages of the invention will become apparent as the description progresses.

Figure 1:
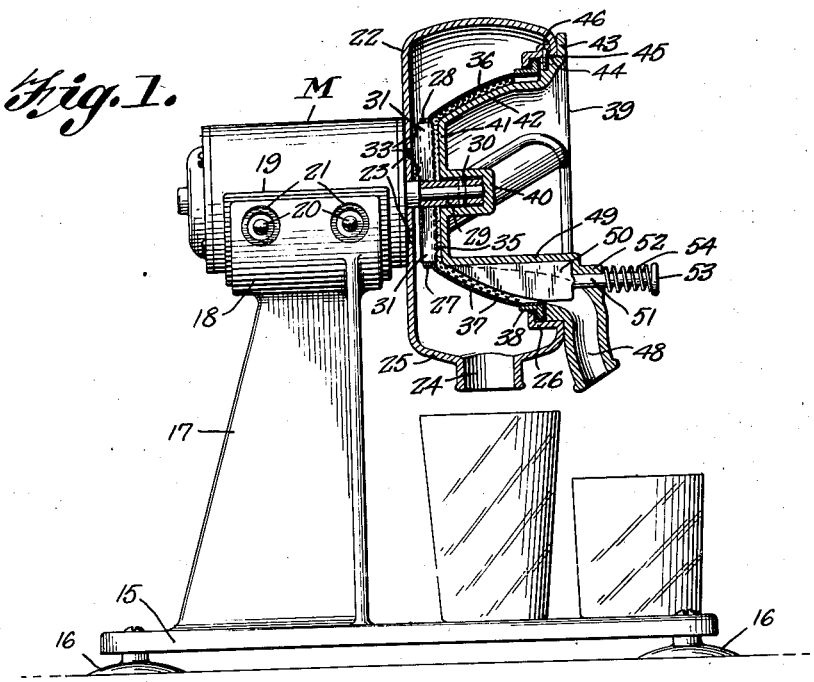
Figure 2:
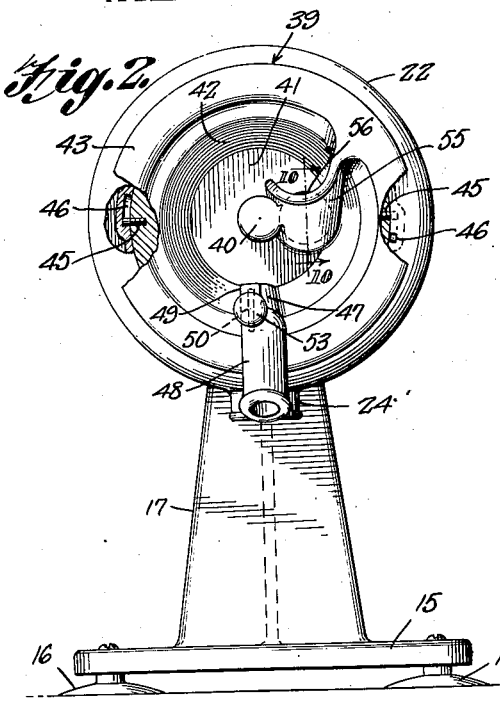
Figure 3:
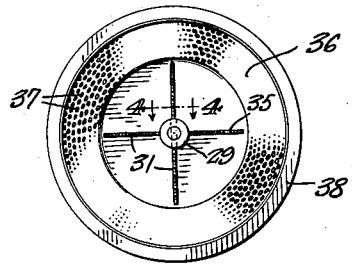
Figure 4:
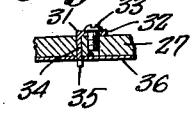

In the accompanying drawings forming a part of this specification and in which like numerals are employed to designate corresponding parts throughout:

Figure 1 is a side elevational view of a preferred form of the invention with the extracting head in vertical section, Figure 2 is a front elevational view of the assembled device, Figure 3 is a front detail elevation of the assembled separator and cutter, Figure 4 is a detail sectional view taken on line 4—4 of Figure 3, Figure 5 is a rear elevational view of the cutter and separator, Figure 6 is a perspective view of the cutter head, Figure 7 is a perspective view of one of the cutter blades, Figure 8 is a fragmentary perspective view of part of the casing, Figure 9 is a transverse sectional view through the motor support bracket with the motor in elevation thereon, Figure 10 is an enlarged fragmentary section taken on line 10—10 of Figure 2, and Figure 11 is an enlarged fragmentary section through a modified form of the device.

Referring to Figures 1 to 10 inclusive, wherein is illustrated a preferred embodiment of the invention, 15 designates a rectangular base plate adapted to be supported horizontally on a support surface through the medium of vacuum cups 16 or the like. In an off-center position on the base plate 15 is formed an upstanding bracket arm 17 formed integral with an approximately semicircular support saddle 18.

On the saddle 18 is adapted to be mounted an electric motor M of known construction having a drive shaft S projecting horizontally from the forward end thereof. Between the saddle and the motor is preferably interposed a lining sheet 19 of insulating and cushioning material, such as soft rubber. The motor is firmly fastened to the bracket saddle by means of screws 20 extending through apertures in the saddle and into the motor housing and insulated from the saddle by insulating washers 21.

To the front end of the motor housing is tightly secured a vertically disposed casing 22 having the rear wall fastened to the housing by screws 23 and having a flanged outlet 24 at the bottom of the circumferential wall 25. At the edge of the front opening of the casing 22 is formed an inwardly directed angular flange 26.

On the motor shaft S is mounted a cutter head embodying a flat disk-shaped plate 27 provided with a plurality of, in the present instance four, radial slots 28 and having a relatively long hub sleeve 29 projecting forwardly thereof. This sleeve is designed to fit snugly upon the drive shaft and is removably secured thereon by a transverse pin 30. Detachably secured to the cutter disk 27 are a plurality of cutters 31 of angular cross section fashioned so that one flange 32 thereof is to be fitted against the back face of the disk and firmly fastened thereon by screws 33. The complementary flange 34 is adapted to extend through one of the slots 28 and is serrated at its outer edge to form cutter teeth 35 which protrude forwardly of the disk to form effective cutting means at the front face thereof.

Concentrically mounted in the casing 22 is a separator section 36 in the form of an approximately frusto-conical slightly curved circumferential wall provided with closely spaced apertures 37. The reduced inner end of this perforated wall section is firmly secured to the peripheral edge of the disk 27 while the outer enlarged end is secured to the interior of a ring 38 of angular cross section rotatably associated with the flange 26 of the casing.

Connected to the front of and projecting within the casing is a bowl-shaped cover section 39 having formed at its center an axially disposed socket 40 shaped to cover the shaft and the sleeve 29. The inner wall 41 and the circumferential wall 42 of this cover are formed to conform to and extend in parallel spaced relation with the cutter disk and the perforated wall respectively. At its outer periphery the cover 39 is formed with an outwardly directed flange 43 formed to fit tightly against the outer edge of the casing and having a rib 44 designed to fit accurately within the casing flange 36 while affording clearance for the rotary ring 38 disposed between this rib and the inturned lip on the casing flange. At diametrically opposed positions on the rib 44 are secured radial pins 45 disposed to project outwardly of the rib to engage arcuate slots 46 in the flanged front of the casing for detachable connection of the cover. At the bottom portion the cover section is formed with an axially extending duct 47 which merges into a depending discharge spout 48. At one side of the duct 47 is formed a scraper housing 49 shaped to receive therein a tapered scraper blade 50 disposed axially between the housing and the bottom of the perforated wall 36. The blade 50 is formed with a stem 51 which projects forwardly through a slide bearing 52 and carries on its outer end a removable head 53. On the projecting part of this stem is sleeved, between the head 53 and the bearing 52, a coiled compression spring 54 adapted to yieldingly maintain the blade in retracted position, that is, with the scraper edge removed or retracted substantially from the perforated wall, as shown to advantage at Figure 1. Upon depression of the blade through the medium of the button head 53 the scraping edge of the blade is brought to a position adjacent the separator wall so as to remove material accumulated on and clinging thereto. At one side of the inwardly directed cover section 39 is formed an approximately axially extending inclined conducting trough 55 of concave arcuate cross section to provide a passage in registration with a circular opening 56 through the wall 41.

The product from which juice is to be extracted, such as a fruit or vegetable, is placed in the feed passage of the trough 55 and forced thereon through the feed inlet 56 where it contacts with the rotary cutters of the head. The material thus disintegrated is carried, by centrifugal action, against the inner side of the perforated rotating wall 36 whence the juice, by centrifugal force, is expelled through the apertures into the casing and blows therefrom through the outlet 24 into a receiving vessel. The pulp and other solid residue matter of the product is discharged from the chamber between the wall of the cover and the perforated separator through the duct 47 and spout 48 and dropped into a separate receptacle. From time to time the blade plunger stem is manually depressed to extend the blade toward the separator wall so as to remove particles of matter adhering thereto and prevent blockage of the apertures.

As shown at Figure 11, illustrating a modified construction of the device, the feed passage may take the form of an inclined feed tube 57 having a flange 58 for connection with the end wall 41 of the cover in registration with the feed port 56 therein, for use in connection with products of elongated formation.

It is to be understood that the forms of my invention herewith shown and described are to be taken as preferred and modified examples of the same and that various changes relative to the material, size, shape and arrangement of parts may be resorted to without departing from the spirit of the invention or the scope of the subjoined claims.

Having thus described my invention, I claim:

1. In a juice extracting device, a casing closed at one end and open at the other end and having a juice outlet, a rotary cutter head mounted in the casing adjacent the closed end, a perforated conoidal juice and pulp separating wall secured to the periphery of the cutter head, a cover member mounted on the casing adjacent to and approximately parallel with the perforated wall and cutter head, the said cover member having a feed opening therein, a housing on the cover member providing a pulp outlet duct communicating with a discharge spout, a scraper blade mounted in the housing and disposed in axial scraping relation with the perforated wall, the said blade having a stem projecting outwardly through a slide bearing on the housing, and a spring on the outer portion of the stem yieldingly urging the blade to retracted position with relation to the said perforated wall.

2. In a juice extracting device, a casing having a vetrical closed end wall and open at the other end, a juice outlet at the bottom of the said casing, a rotary cutter head mounted in the adjacent to and parallel with the closed end, a perforated conoidal juice and pulp separating wall secured to the periphery of the cutter head and arranged within the casing, a cover member attached to the open edge portion of the casing disposed adjacent to and approximately parallel with the perforated wall and the cutter head and having a feed opening leading into the cutter head, an elongated housing on the bottom of the cover member providing a pulp outlet duct communicating with a downwardly directed discharge spout, a scraper blade mounted within the housing and disposed in axial scraping relation with the said perforated wall, an outwardly projecting stem formed on the outer end of the blade and extending through a slide bearing on the housing, and a coiled spring sleeved about the outwardly projecting portion of the stem so as to yieldingly urge the blade to a predetermined spaced relation with the perforated wall.

3. In a juice extracting device, a casing closed at one end and open at the other end and having a juice outlet, a rotary cutter head mounted in the casing adjacent the closed end, a perforated conoidal juice and pulp separating wall secured to the periphery of the cutter head, a cover member mounted on the casing and adjacent to and approximately parallel with the perforated wall and cutter head, the said cover member having a feed opening therein, a housing on the cover member providing a pulp outlet duct communicating with a discharge spout, a scraper blade mounted in the housing and disposed in axial scraping relation with the perforated wall, the said blade having a stem projecting outwardly through a slide bearing on the housing, a spring on the outer portion of the stem yieldingly urging the blade to retracted position with relation to the said perforated wall, and an inclined transversely curved conducting trough connected in registration with the feed opening for feeding material to the cutter.

ALBERT D. GRAU.